(12) United States Patent
Kuan

(10) Patent No.: US 9,874,253 B2
(45) Date of Patent: Jan. 23, 2018

(54) BICYCLE DISK BRAKE CALIPER WITH A FLUID BLEEDING STRUCTURE

(75) Inventor: Kim Hong Kuan, Semerah (MY)

(73) Assignee: Shimano, Inc., Sakai, Osaka (JP)

( * ) Notice: Subject to any disclaimer, the term of this patent is extended or adjusted under 35 U.S.C. 154(b) by 811 days.

(21) Appl. No.: 13/237,245

(22) Filed: Sep. 20, 2011

(65) Prior Publication Data

US 2013/0068577 A1 Mar. 21, 2013

(51) Int. Cl.
| | |
|---|---|
| *B62L 3/00* | (2006.01) |
| *F16D 55/224* | (2006.01) |
| *B60T 11/30* | (2006.01) |
| *B60T 17/22* | (2006.01) |
| *B62L 3/02* | (2006.01) |
| *F16D 121/04* | (2012.01) |
| *F16D 125/16* | (2012.01) |

(52) U.S. Cl.
CPC ............ *F16D 55/224* (2013.01); *B60T 11/30* (2013.01); *B60T 17/222* (2013.01); *B62L 3/023* (2013.01); *F16D 2121/04* (2013.01); *F16D 2125/16* (2013.01)

(58) Field of Classification Search
CPC ........ B60T 11/30; B60T 17/222; B62L 3/023; F16D 2125/16; F16D 2121/04; F16D 55/224; F16D 55/228
USPC ............... 188/24.11, 26, 71.1, 344, 369, 352
See application file for complete search history.

(56) References Cited

U.S. PATENT DOCUMENTS

| | | | |
|---|---|---|---|
| 4,068,746 A | | 1/1978 | Munechika |
| 4,497,176 A | * | 2/1985 | Rubin et al. ..................... 60/584 |
| 4,902,077 A | * | 2/1990 | Belart et al. ................. 303/113.1 |
| 4,971,402 A | * | 11/1990 | Chen ........................ B60T 8/32 303/113.1 |
| 5,226,452 A | * | 7/1993 | Muller et al. ............ 137/630.22 |
| 5,273,141 A | * | 12/1993 | Veret et al. .................... 188/352 |
| 5,390,771 A | * | 2/1995 | Hinkens et al. .............. 188/344 |
| 5,462,137 A | * | 10/1995 | Aubry ....................... B60T 7/08 188/72.6 |
| 5,560,457 A | * | 10/1996 | Rike ............................. 188/352 |

(Continued)

FOREIGN PATENT DOCUMENTS

| | | |
|---|---|---|
| DE | 1630873 | 6/1971 |
| GB | 951754 | 3/1964 |

(Continued)

OTHER PUBLICATIONS

Shimano Front Disc Brake user's guide and Technical Service Instructions, published May 2008.

*Primary Examiner* — Xuan Lan Nguyen
(74) *Attorney, Agent, or Firm* — James A. Deland

(57) ABSTRACT

A bicycle brake caliper apparatus comprises a caliper housing and a plug. The caliper housing includes a fluid chamber and an opening for receiving the plug therein, wherein the opening extends to an outside of the housing at a first location. The housing also includes a fluid passage in fluid communication with the fluid chamber, wherein the fluid passage is in fluid communication with an outside of the housing at a second location offset from the first location. The fluid passage is closed when the plug is in a first position. The fluid passage is open when the plug is in a second position so that fluid is allowed to flow from the fluid chamber, through the fluid passage and to the outside of the housing at the second location.

18 Claims, 8 Drawing Sheets

(56) References Cited

U.S. PATENT DOCUMENTS

| | | | |
|---|---|---|---|
| 5,853,071 A * | 12/1998 | Robinson | B60T 11/30 |
| | | | 188/352 |
| 5,944,068 A * | 8/1999 | Hool | 141/65 |
| 6,193,030 B1 * | 2/2001 | Kuo | 188/344 |
| 7,412,829 B2 | 8/2008 | Matsushita et al. | |
| 2003/0079946 A1 * | 5/2003 | Takizawa et al. | 188/24.19 |
| 2006/0065498 A1 * | 3/2006 | Myers | 188/352 |
| 2006/0076197 A1 * | 4/2006 | Ishida | 188/72.8 |
| 2008/0034572 A1 | 2/2008 | Nanri | |
| 2011/0000749 A1 * | 1/2011 | Yamashita et al. | 188/71.1 |

FOREIGN PATENT DOCUMENTS

| | | |
|---|---|---|
| JP | 2011-163401 A | 8/2011 |
| TW | M343636 U | 11/2008 |
| WO | 2005/078307 A2 | 8/2005 |

* cited by examiner

BICYCLE DISK BRAKE CALIPER WITH A FLUID BLEEDING STRUCTURE

BACKGROUND OF THE INVENTION

The present invention is directed to disk brake devices and, more particularly, to a hydraulically-operated bicycle disk brake caliper with a fluid bleeding structure.

Disk brake assemblies for bicycles and other vehicles are well known. A typical bicycle disk brake assembly comprises a brake disk mounted to a hub that rotates together with a bicycle wheel. A caliper is mounted over the edge of the brake disk, wherein the caliper supports first and second brake pads that straddle the brake disk. During operation, a pair of hydraulically-operated pistons move the first and second brake pads to frictionally contact opposite sides of the brake disk to stop rotation of the brake disk and the bicycle wheel.

SUMMARY OF THE INVENTION

The present invention is directed to various features of a disk brake apparatus. In one embodiment, a bicycle brake caliper apparatus comprises a caliper housing and a plug. The caliper housing includes a fluid chamber and an opening for receiving the plug therein, wherein the opening extends to an outside of the housing at a first location. The housing also includes a fluid passage in fluid communication with the fluid chamber, wherein the fluid passage is in fluid communication with an outside of the housing at a second location offset from the first location. The fluid passage is closed when the plug is in a first position. The fluid passage is open when the plug is in a second position so that fluid is allowed to flow from the fluid chamber, through the fluid passage and to the outside of the housing at the second location. Additional inventive features will become apparent from the description below, and such features alone or in combination with the above features and their equivalents may form the basis of further inventions as recited in the claims.

DETAILED DESCRIPTION OF THE EMBODIMENTS

Figure 1:
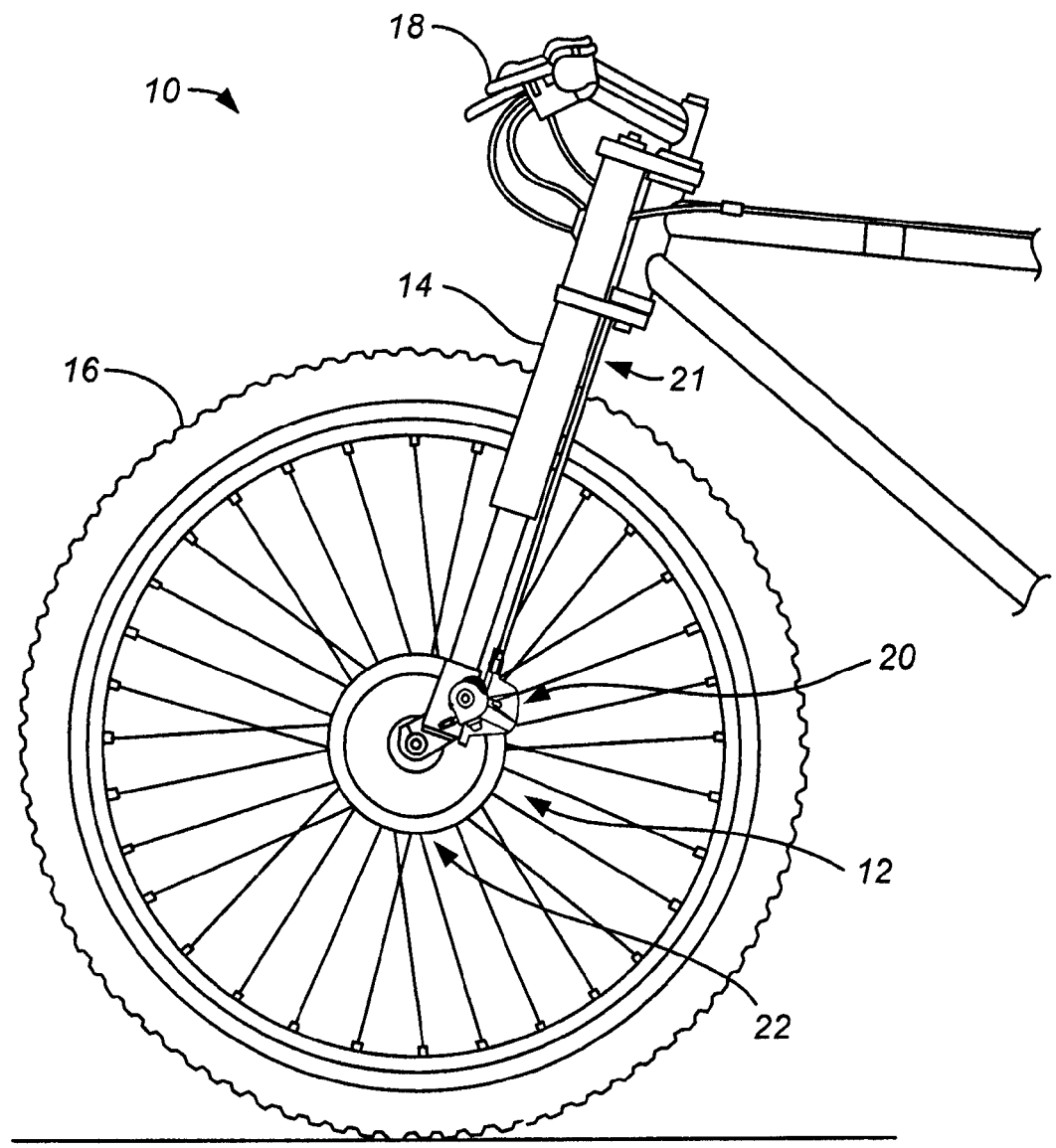
FIG. 1 is a side view of a front portion of a bicycle that employs an embodiment of a disk brake assembly.

FIG. 1 is a side view of a particular embodiment of a bicycle 10. Bicycle 10 includes a hydraulically-operated disk brake assembly 12 coupled to a front fork 14 for selectively stopping the rotation of a wheel 16. Disk brake assembly 12 includes a brake lever assembly 18 with a conventional hydraulically-operated master cylinder (not shown), a disk brake caliper 20 operatively coupled to brake lever 18 assembly through a fluid conduit 21, and a brake disk 22. Disk brake caliper 20 is fixedly coupled to fork 14 of bicycle 10, while brake disk 22 is fixedly coupled to a hub (not shown) of wheel 16 in a well-known manner. Disk brake caliper 20 applies a clamping force to brake disk 22 in response to the operation of brake lever 18 to stop rotation of bicycle wheel 16.

Figure 2:
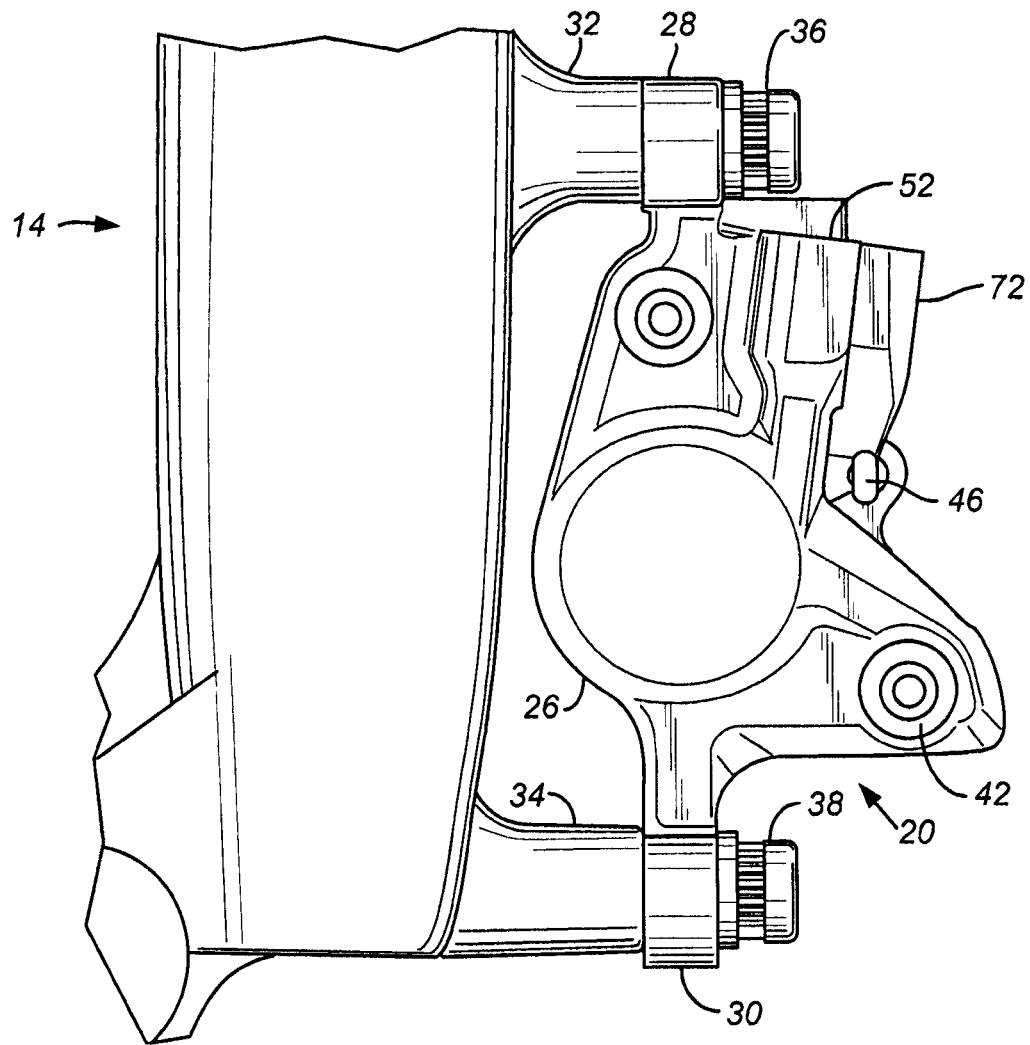
FIG. 2 is a side view of an embodiment of a disk brake caliper.
Figure 3:
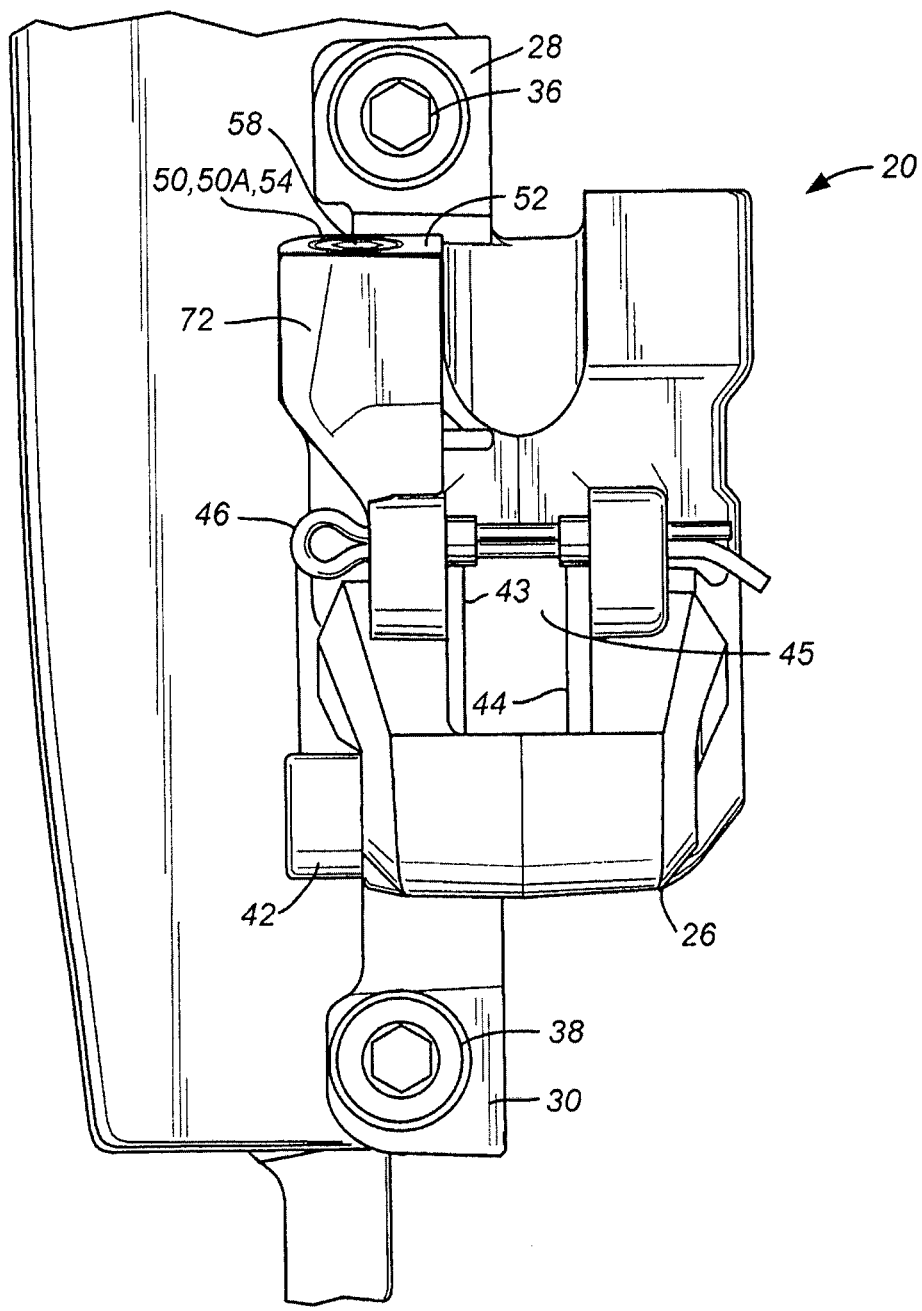
FIG. 3 is a front view of the caliper.
Figure 4:
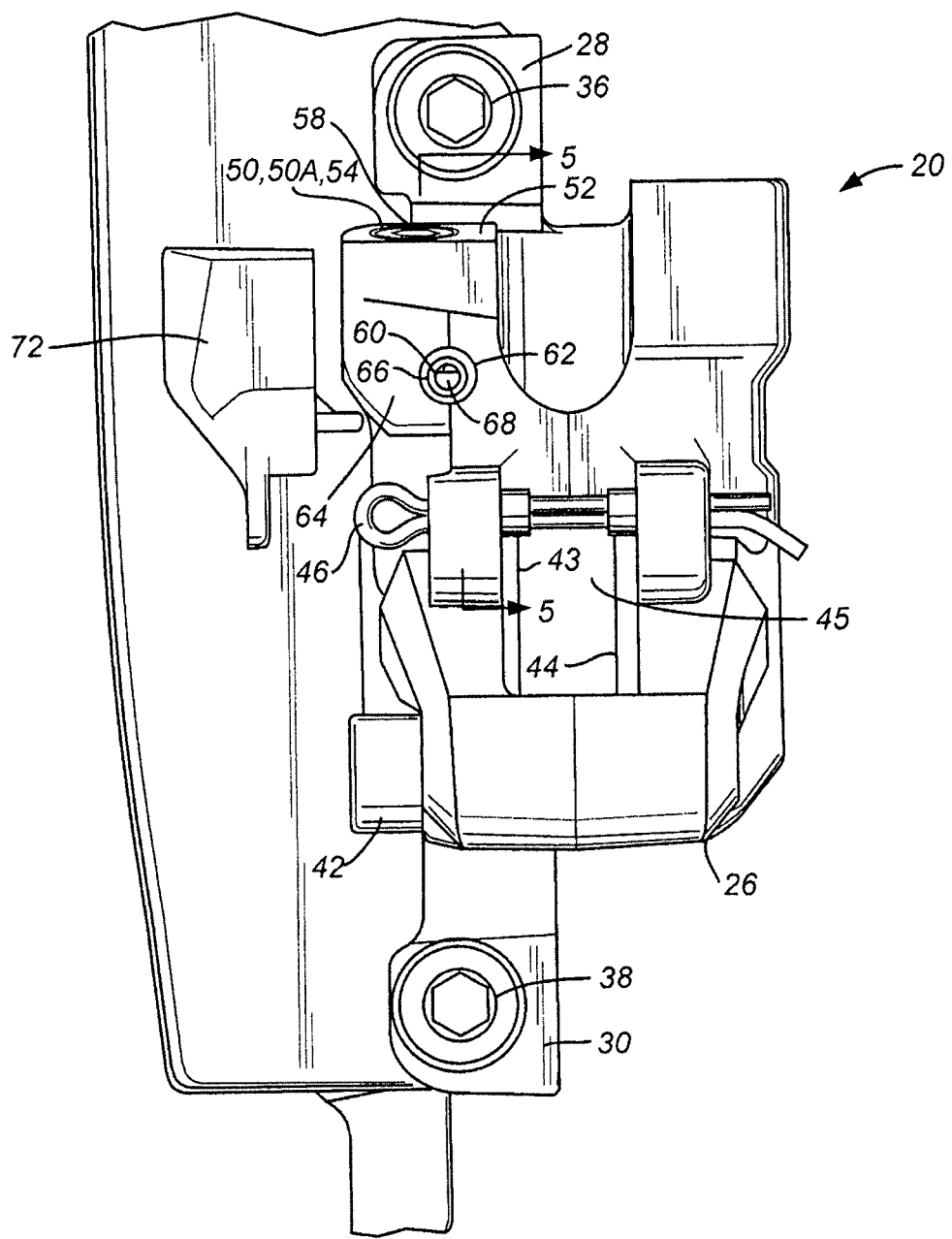
FIG. 4 is a front view of the caliper with a protective cover removed.

As shown in FIGS. 2-4, disk brake caliper 20 includes a caliper housing 26 with mounting flanges 28 and 30 for mounting caliper housing 26 to corresponding mounting bosses 32 and 34 on front fork 14 through mounting bolts 36 and 38 in a well-known manner. A fluid conduit coupling 42 is formed adjacent to mounting flange 30 for coupling to fluid conduit 21. A piston-operated first brake pad 43 is coupled to caliper housing 26 for movement between a release position and a braking position, and a piston-operated second brake pad 44 is coupled to caliper housing 26 and arranged substantially parallel to first brake pad 43 to form a brake disk receiving slot 45 therebetween. In this embodiment, upper portions of first and second brake pads 43 and 44 are slidably supported on a support shaft 46 in the form of a cotter pin.

Figure 5:
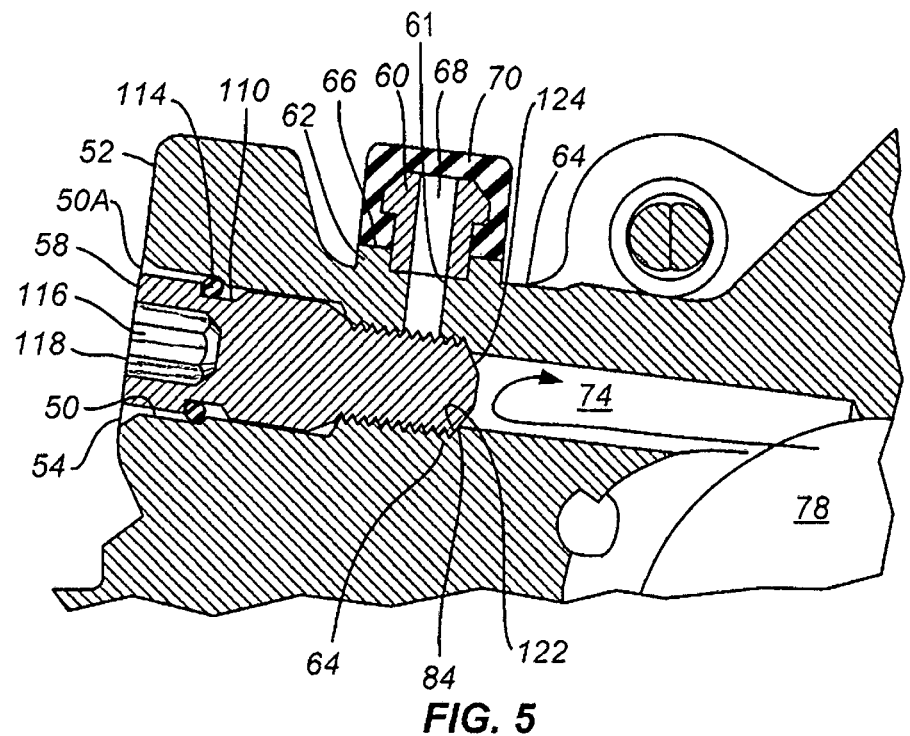
FIG. 5 is a cross-sectional view of the caliper taken along line 5-5 in FIG. 4 showing a fluid plug in a closed position.

As shown in FIGS. 4 and 5, a first opening 50 having a first outermost surface opening 50A defined by an outermost surface of housing 26 is formed on a top left surface 52 of caliper housing 26, wherein first opening 50 extends to an outside of caliper housing 26 at a first location 54. First opening 50 is dimensioned for receiving a fluid plug 58 therein. A hose adapter 60 is press fit into an outlet opening 61 that forms a fluid exit from caliper housing 26 at a mounting boss 62 disposed on a front surface 64 of caliper housing 26 at a second location 66, wherein hose adapter 60 includes a central fluid passage 68. A rubber cap 70 is detachably coupled to hose adapter 60 for covering hose adapter 60, and a cover 72 is detachably coupled to the left side of caliper housing 26 for covering hose adapter 60 and cap 70. As shown more clearly in FIG. 8, both first opening 50 and fluid passage 68 in hose adapter 60 are in fluid communication with a fluid passage 74, wherein first opening 50 forms a part of fluid passage 74, and fluid passage 74 is in fluid communication with a conventional fluid chamber 78.

Figure 8:
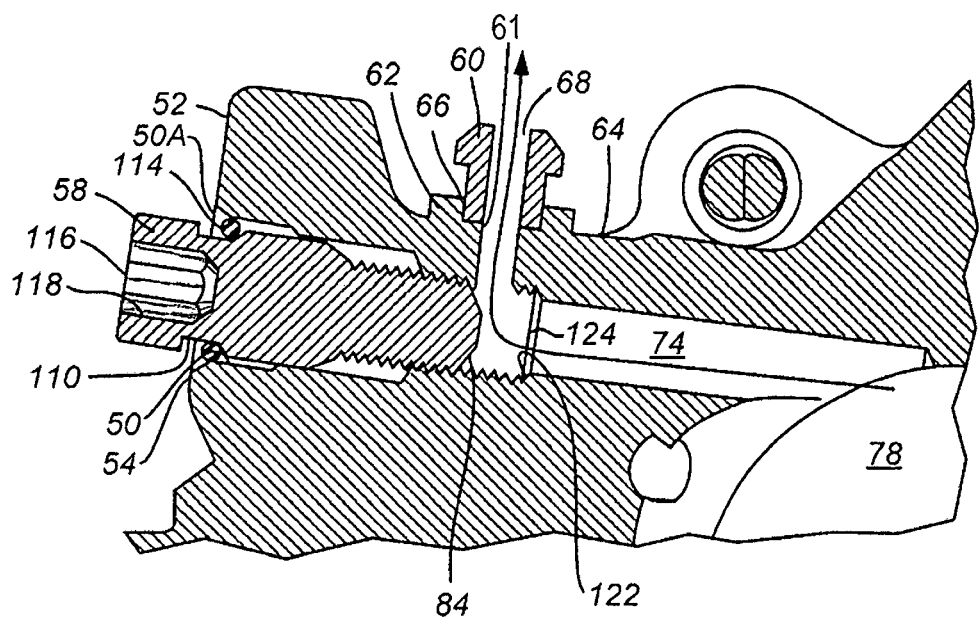
FIG. 8 is a cross-sectional view of the caliper, similar to FIG. 5, showing the fluid plug in the open position.
Figure 6A:
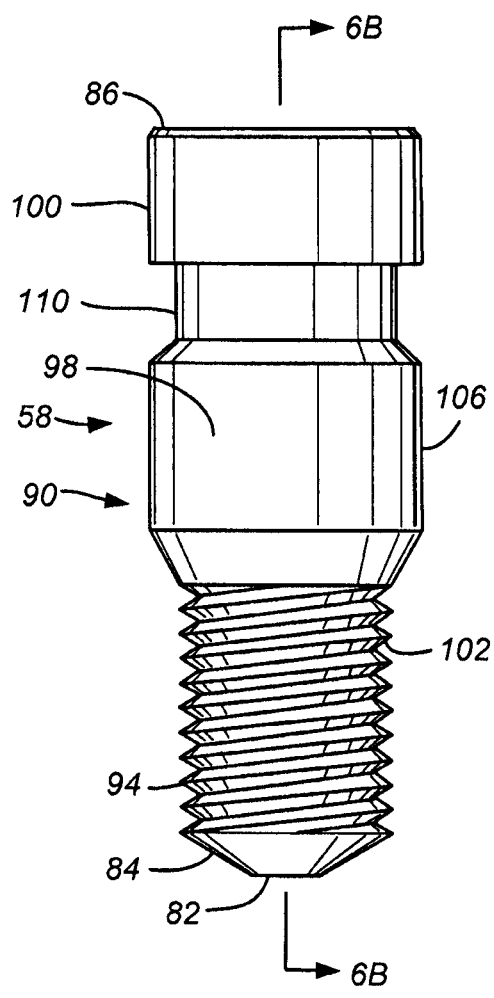
FIG. 6A is front view of a particular embodiment of a fluid plug.
Figure 6B:
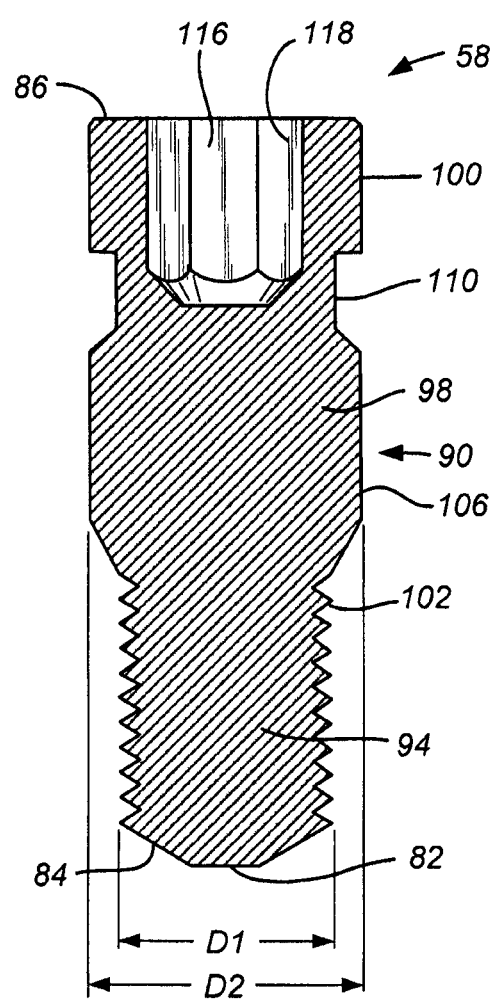
FIG. 6B is a cross-sectional view of the fluid plug taken along line 6B-6B in FIG. 6A.

FIG. 6A is front view of a particular embodiment of fluid plug 58, and FIG. 6B is a cross-sectional view of fluid plug 58 taken along line 6B-6B in FIG. 6A. In this embodiment, fluid plug 58 comprises an inner end 82 that forms an angled seat 84, an outer end 86, and a main body 90 extending between inner end 82 and outer end 86. Main body 90 includes a threaded first section 94, a second section 98 and a third section 100, wherein first section 94 is disposed between second section 98 and inner end 82, and third section 100 is disposed between second section 98 and outer end 86. A threaded outer peripheral surface 102 of first section 94 has a diameter D1 that is less than a diameter D2 of an outer peripheral surface 106 of second section 98. A radially-recessed, seal-supporting outer peripheral surface 110 is disposed on main body 90 between second section 98 and third section 100 for installing a seal such as an O-ring 114 (FIGS. 5 and 8). O-ring 114 surrounds seal supporting outer peripheral surface 110 and closes first opening 50 to prevent fluid from flowing through first opening 50 and past fluid plug 58 to the outside of caliper housing 26 at first location 54. A tool-engagement opening 116 in the form of a blind bore formed by a hexagonal inner peripheral surface 118 is formed in third section 100.

FIGS. 4 and 5 show fluid plug 58 in a first, closed position wherein angled seat 84 sealingly engages a complementary angled seat 122 formed at a second opening 124 in fluid passage 74 where fluid passage 74 joins first opening 50. In this embodiment, fluid plug 58 has no fluid passage that allows fluid to pass through fluid plug 58 to the outside of caliper housing 26 or to the portion of fluid passage 74 that is in fluid communication with central fluid passage 68 in hose adapter 60. As a result, fluid within chamber 78 is not allowed to escape to the outside of caliper housing 26 when fluid plug 58 is in the closed position.

Figure 7:
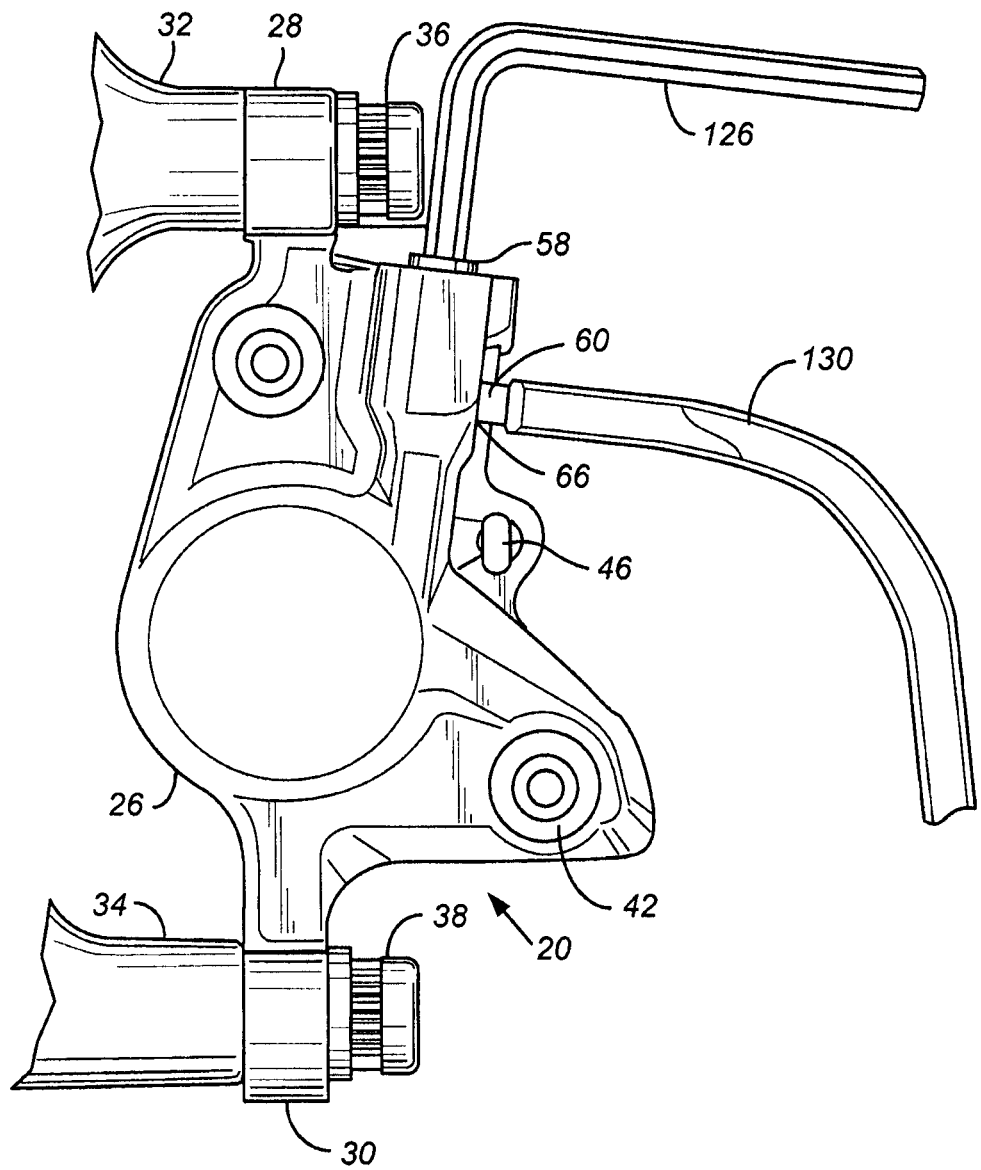
FIG. 7 is a side view of the caliper with the fluid plug in an open position.

FIGS. 7 and 8 show fluid plug 58 after a tool such as an Allen wrench 126 has been inserted into tool engagement opening 116 in fluid plug 58 and fluid plug 58 has been rotated to a second, open position. In this position, angled seat 84 of fluid plug 58 is spaced apart from angled seat 122, thereby opening second opening 124 and allowing fluid in chamber 78 to pass through fluid passage 74, through central fluid passage 68 in hose adapter 60 and into a collection hose 130 attached to hose adapter 60. Since fluid plug 58 has no fluid passage that allows fluid to pass through fluid plug 58 to the outside of caliper housing 26, and since O-ring 114 prevents fluid from flowing through first opening 50 and past fluid plug 58 to the outside of caliper housing 26, no fluid exits caliper housing 26 through first opening 50 at first location 54. As a result, fluid exits caliper housing 26 only through hose adapter 60 at second location 66. Unlike known bleeding methods, the user need not open a bleeder screw wherein fluid flows out of the bleeder screw itself. Thus, there is no risk of brake fluid leaking onto the ground if a collection hose attached to the bleeder screw is dislodged as a result of interference by the tool or rotation of the bleeder screw. Since collection hose 130 is connected to hose adapter 60 located well away from fluid plug 58, collection hose 130 does not interfere with opening of fluid plug 58.

Figure 9A:
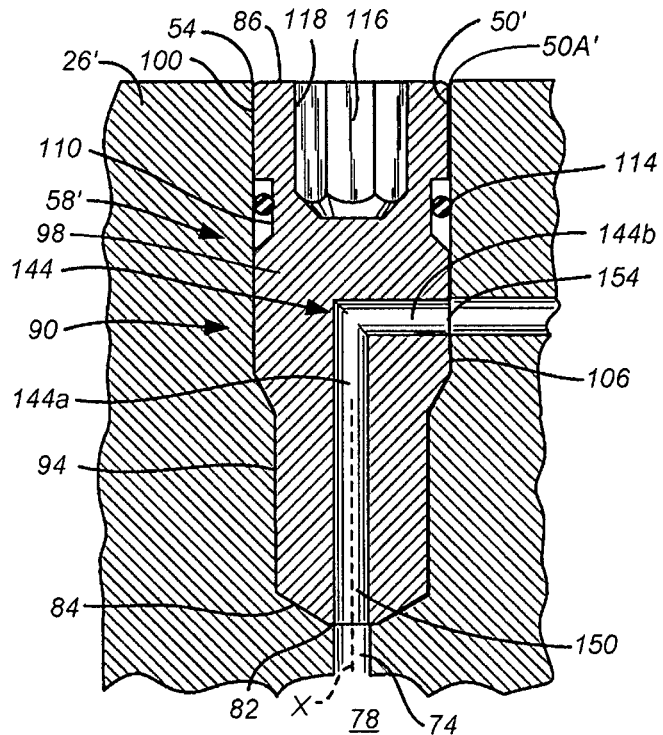
FIG. 9A is a cross-sectional view, similar to FIG. 6B, of an alternative embodiment of a fluid plug in a first position.
Figure 9B:
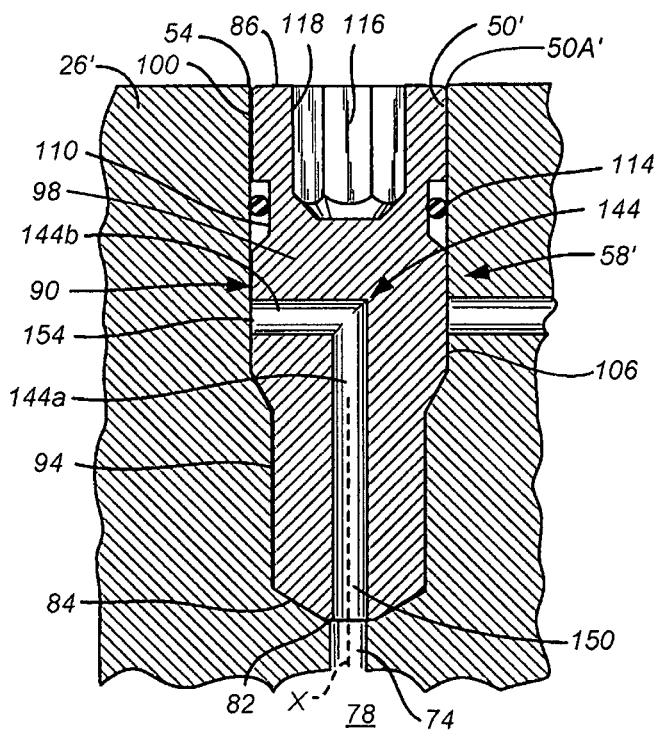
FIG. 9B is a cross-sectional view of the fluid plug shown in FIG. 9A in a second position.

FIGS. 9A and 9B are cross-sectional views of an alternative embodiment of a fluid plug 58' disposed in a modified first opening 50' having a first outermost surface opening 50A' defined by an outermost surface of a modified caliper housing 26'. This embodiment has substantially the same structure as fluid plug 58 in the above embodiment, so the same components are numbered the same, and only the differences will be described in detail. In this embodiment, fluid plug 58' omits the threads from first section 94 and is structured to be disposed in first opening 50' in caliper housing 26' so that fluid plug 58' is rotatable around an axis X but is axially immovable. Fluid plug 58' has a central fluid passage 144 comprising an axial (vertical) portion 144a and a transverse portion 144b that may be horizontal as shown or inclined. Axial portion 144a forms a first opening 150 at inner end 82 of fluid plug 58', and lateral portion 144b forms a second opening 154 at outer peripheral surface 106 of second section 98 of fluid plug 58'. Thus, when fluid plug 58' is disposed in first opening 50', central fluid passage 144 forms a part of fluid passage 74 and is in fluid communication with fluid chamber 78. Furthermore, when fluid plug 58' is oriented in an open position shown in FIG. 9A, central fluid passage 144 is in fluid communication with central fluid passage 68 in hose adapter 60. However, when fluid plug 58' is oriented in a closed position shown in FIG. 9B, second opening 154 in side surface 106 is blocked by the inner peripheral surface of first opening 50', thereby closing fluid passage 74. As in the first embodiment, O-ring 114 prevents fluid from flowing through first opening 50' and past fluid plug 58' to the outside of caliper housing 26' at first location 54.

While the above is a description of various embodiments of inventive features, further modifications may be employed without departing from the spirit and scope of the present invention. For example, the size, shape, location or orientation of the various components may be changed as desired. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Terms of degree such as "substantially," "about" and "approximately" as used herein include a reasonable amount of deviation of the modified term such that the end result is not significantly changed. Thus, the scope of the invention should not be limited by the specific structures disclosed or the apparent initial focus or emphasis on a particular structure or feature.

What is claimed is:
1. A bicycle hydraulic brake caliper apparatus comprising:
a caliper housing having a fluid chamber;
a plug;
wherein the housing includes a first opening for receiving the plug therein, wherein the first opening has a first outermost surface opening defined by an outermost surface of the housing at a first location of the housing;
wherein the housing includes a fluid passage in fluid communication with the fluid chamber, wherein the fluid passage has an outlet opening fixedly provided on the housing at a second location of the housing offset from the first location so that fluid flowing through the fluid passage exits the housing at the outlet opening;
wherein the fluid passage is closed when the plug is in a first position;
wherein the fluid passage is open when the plug is in a second position so that fluid is allowed to flow from the fluid chamber through the fluid passage, bypassing the first outermost surface opening, to the outside of the housing at the second location; and
wherein the plug rotates between the first position and the second position.

2. The apparatus according to claim 1 wherein the housing includes a second opening disposed in the fluid passage between the fluid chamber and the second location, wherein the second opening is closed when the plug is in the first position, and wherein the second opening is open when the plug is in the second position.

3. The apparatus according to claim 1 further comprising a fluid hose adapter disposed at the second location, wherein the fluid hose adapter is in fluid communication with the fluid passage, and wherein the fluid hose adapter is structured to attach a fluid hose.

4. A bicycle hydraulic brake caliper apparatus comprising:
a caliper housing having a fluid chamber;
a plug;

wherein the housing includes a first opening for receiving the plug therein, wherein the first opening has a first outermost surface opening defined by an outermost surface of the housing at a first location of the housing;

wherein the housing includes a fluid passage in fluid communication with the fluid chamber, wherein the fluid passage has an outlet opening fixedly provided on the housing at a second location of the housing offset from the first location so that fluid flowing through the fluid passage exits the housing at the outlet opening;

a fluid hose adapter disposed at the second location, wherein the fluid hose adapter is in fluid communication with the fluid passage, and wherein the fluid hose adapter is structured to attach a fluid hose; and a cap for covering the fluid hose adapter;

wherein the fluid passage is closed when the plug is in a first position; and wherein the fluid passage is open when the plug is in a second position so that fluid is allowed to flow from the fluid chamber through the fluid passage, bypassing the first outermost surface opening, to the outside of the housing at the second location.

5. The apparatus according to claim 1 wherein the first opening is in fluid communication with the fluid passage.

6. The apparatus according to claim 5 wherein the plug includes a seat that blocks fluid from flowing through the fluid passage when the plug is in the first position.

7. The apparatus according to claim 6 wherein an O-ring is disposed around the plug for blocking fluid from flowing through the first opening.

8. The apparatus according to claim 1 wherein the plug does not protrude above an exterior surface of the housing at the first location when the plug is in the first position.

9. The apparatus according to claim 1 wherein the plug comprises a screw.

10. The apparatus according to claim 9 wherein the first opening has a threaded inner peripheral surface, and wherein the plug screws into the threaded inner peripheral surface.

11. The apparatus according to claim 1 wherein the plug includes a central fluid passage that forms part of the fluid passage.

12. The apparatus according to claim 11 wherein the plug rotates around an axis, and wherein the central fluid passage includes an axial portion and a transverse portion.

13. The apparatus according to claim 12 wherein the axial portion forms a first opening at an inner end of the plug, and wherein the transverse portion forms a second opening at an outer peripheral surface of the plug.

14. The apparatus according to claim 1 wherein the plug includes a tool engagement surface.

15. The apparatus according to claim 14 wherein the tool engagement surface is formed at least in part by an inner peripheral surface of the plug.

16. A bicycle hydraulic brake caliper apparatus comprising:

a caliper housing having a fluid chamber;

a plug;

wherein the housing includes a first opening for receiving the plug therein, wherein the first opening has a first outermost surface opening defined by an outermost surface of the housing at a first location of the housing;

wherein the housing includes a fluid passage in fluid communication with the fluid chamber, wherein the fluid passage has an outlet opening fixedly provided on the housing at a second location of the housing offset from the first location so that fluid flowing through the fluid passage exits the housing at the outlet opening;

wherein the fluid passage is closed when the plug is in a first position;

wherein the fluid passage is open when the plug is in a second position so that fluid is allowed to flow from the fluid chamber through the fluid passage, bypassing the first outermost surface opening, to the outside of the housing at the second location;

wherein the housing includes a second opening disposed in the fluid passage between the fluid chamber and the second location;

wherein the second opening is closed when the plug is in the first position;

wherein the second opening is open when the plug is in the second position; and wherein the second opening opens the fluid passage to the atmosphere through the outlet opening when the plug is in the second position.

17. A bicycle hydraulic brake caliper apparatus comprising:

a caliper housing having a fluid chamber;

a plug;

wherein the housing includes a first opening for receiving the plug therein, wherein the first opening extends to an outside of the housing at a first location;

wherein the housing includes a fluid passage in fluid communication with the fluid chamber, wherein the fluid passage is in fluid communication with an outside of the housing at a second location offset from the first location;

wherein the fluid passage is closed when the plug is in a first position;

wherein the fluid passage is open when the plug is in a second position so that fluid is allowed to flow from the fluid chamber through the fluid passage, bypassing the plug, to the outside of the housing at the second location; and wherein the plug rotates between the first position and the second position.

18. A bicycle hydraulic brake caliper apparatus comprising:

a caliper housing having a fluid chamber;

a plug, wherein the plug is structured to prevent fluid from flowing through the plug;

wherein the housing includes a first opening for receiving the plug therein, wherein the first opening extends to an outside of the housing at a first location;

wherein the housing includes a fluid passage in fluid communication with the fluid chamber, wherein the fluid passage is in fluid communication with an outside of the housing at a second location offset from the first location;

wherein the fluid passage is closed when the plug is in a first position;

wherein the fluid passage is open when the plug is in a second position so that fluid is allowed to flow from the fluid chamber through the fluid passage to the outside of the housing at the second location; and wherein the plug rotates between the first position and the second position.

* * * * *

UNITED STATES PATENT AND TRADEMARK OFFICE
CERTIFICATE OF CORRECTION

PATENT NO. : 9,874,253 B2
APPLICATION NO. : 13/237245
DATED : January 23, 2018
INVENTOR(S) : Kim Hong Kuan Page 1 of 1

It is certified that error appears in the above-identified patent and that said Letters Patent is hereby corrected as shown below:

On the Title Page

Correct the name of the assignee from "Shimano, Inc." to --Shimano Components (Malaysia) SDN BHD--.

Signed and Sealed this
Twenty-seventh Day of November, 2018

Andrei Iancu
*Director of the United States Patent and Trademark Office*